Patented Mar. 17, 1953

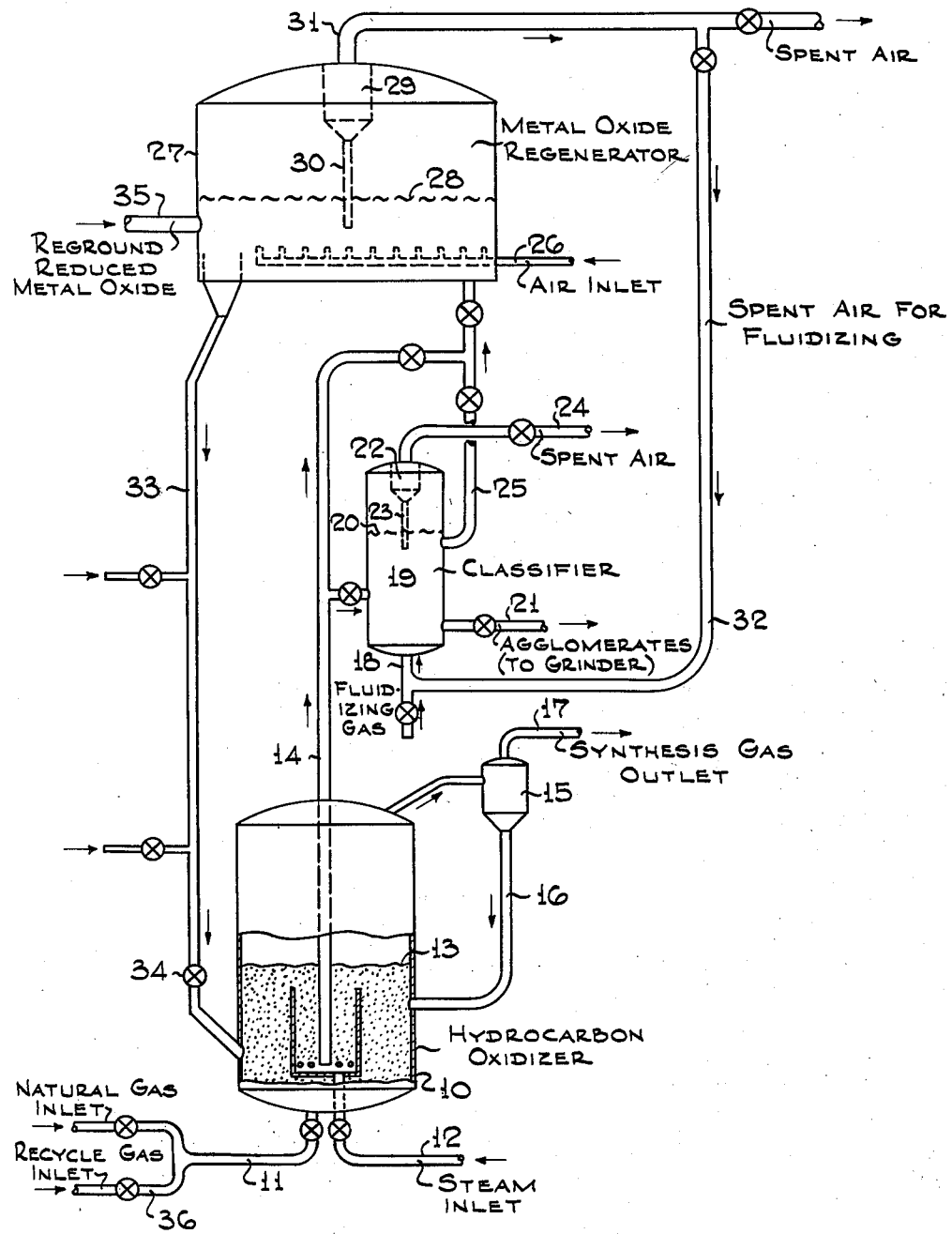

2,631,933

UNITED STATES PATENT OFFICE 2,631,933

PROCESS FOR THE MANUFACTURE OF SYNTHESIS GAS

Walter A. Herbst, Union, N. J., assignor to Standard Oil Development Company, a corporation of Delaware Application October 15, 1947, Serial No. 780,072

5 Claims. (Cl. 48—196)

The present invention relates to the oxidation of gaseous hydrocarbons such as natural gas, refinery gas, methane, ethane, or the like. More particularly, the invention deals with the oxidation of such gaseous hydrocarbons by means of suitable metallic oxides to form mixtures of hydrogen and carbon monoxide suitable for the catalytic synthesis of valuable liquid hydrocarbons and oxygenated organic compounds.

The use of metallic oxides as oxidizing agents for gaseous hydrocarbons has been proposed before. Experimental work has shown that this type of operation is far more advantageously carried out by the fluid solids than by the fixed bed technique due to the excellent heat distribution and control, and better gas-solids contacting properties of the former operation. Thus it is possible to contact the reacting gases with a relatively dense turbulent suspension of finely divided metal oxide or mixture of oxides, such as oxides of copper, iron, manganese, titanium, nickel, etc., fluidized by the upwardly flowing gaseous reactants and reaction products, and obtain yields of 65–90% and higher of synthesis gas.

The oxidation of methane or natural gas with metal oxides ordinarily requires temperatures of 1600° F. and upward for satisfactory conversion to CO and $H_2$. The heat necessary to maintain the normally endothermic reaction at such high temperatures is supplied in the form of the sensible heat of formation of the metal oxide which has been regenerated by air oxidation in a separate fluid oxidation zone which is operated at a higher temperature than the gas oxidation zone. At temperatures in this range, the metal oxides showing the highest activity and selectivity to carbon monoxide and hydrogen begin to sinter. Due to sintering, the finely divided oxygen carrier particles stick to the reactor walls and also agglomerate to form aggregates of non-fluidizable size. These larger particles accumulate to such an extent that they seriously interfere with the fluid operation. The agglomerates also act as nuclei for further agglomeration, thus decreasing the total quantity of fluid particles, and their regeneration without previous grinding is unsatisfactory. To avoid these difficulties it has been the practice to operate at oxidation temperatures below the sintering range of the metal oxides-metals mixtures involved, thus sacrificing optimum conversions and yields to smoother operation.

The present invention overcomes these difficulties and affords additional advantages, the nature of which will be more fully understood from the following description.

It is the principal object of this invention to provide improved means for oxidizing gaseous hydrocarbons with metal oxides to form synthesis gas mixtures, more specifically by means of the fluid solids technique, in such a manner that the agglomerates formed are continuously removed from the system.

In accordance with the present invention, hydrocarbon gases, such as refinery or natural gas, methane, ethane, etc. are first contacted with a dense, turbulent, fluidized mass of finely divided metal oxide or oxides mixture capable of oxidizing hydrocarbon gases to CO and $H_2$ at a temperature that has been experimentally shown to give optimum yields, then the fluidized oxygen carrier is passed through a classifier, preferably a packed vessel, where the agglomerates are segregated from the particles of satisfactory fluidity, the latter then being returned to the process for reoxidation.

It is one of the advantages of this invention that the classifying step enables both the hydrocarbon oxidation and the metal oxide carrier regeneration steps to be carried out at higher temperatures than would be possible if the agglomerates were not removed. It is well known that the finer particles tend to fuse at a lower temperature than the coarser particles. Thus removal of the fines by fusion and agglomeration and by the classification step of the present invention will allow higher temperature operation with far less tendency to agglomerate formation, which agglomerates ordinarily would settle to the bottom of the reactor and eventually prevent fluidization of the carrier.

Furthermore, those metal oxide carriers which seem to have the highest activity and selectivity to synthesis gas production, such as iron carriers, have a pronounced tendency to agglomerate in the temperature range of optimum conversion. Examples of typical carriers of this class are the following:

1. Rutile ore promoted with 6% of 80% $Fe_2O_3$–10% NiO–10% $Cr_2O_3$
2. 38% $Fe_2O_3$–45% $MnO_2$–17% MgO
3. 45% $Fe_2O_3$–45% $MnO_2$–10% MgO
4. 45% $Fe_2O_3$–45% $MnO_2$–10% $Cr_2O_3$ By the process of removing the agglomerates of the present invention, the "seeding" effect of the particles is diminished, thus markedly reducing the over-all tendency of the particles to agglomerate.

The classification step may be carried out by various methods, the preferred method being the use of a packed vessel in which the mixture to be classified may be fluidized, thus causing the agglomerates to settle to the bottom of the packed vessel, from which they may be removed and discarded or processed by grinding to a suitable size range for fluidization and returned to the synthesis gas plant. The unagglomerated carrier may then be removed from the top of the classifier fluid phase and returned to the oxidizer system. The proportion of the total carrier stream to be classified may vary from a relatively small fraction to 100% depending upon the rate of agglomeration which controls the amount of material to be removed.

The metal oxides which may be used as oxygen carriers in the present process may be either that class which are reduced to metals, such as ferrous oxide, cuprous oxide and the like, or the higher oxides of those metals that are capable of forming both higher and lower oxides, such as ferric oxide, cupric oxide, vanadium pentoxide, stannic oxide, titanium dioxide, manganese dioxide, chromic oxides, and mixtures of these oxides. The metal oxides may be unsupported or be supported on such surfaces as kieselguhr, alumina, silica gel, etc.

For effective operation the carrier particles in the methane or natural gas oxidation step should have a particle size within the diameter range of 10 to 300 microns, with preferably 75% having a particle size larger than 44 microns. With the classification stage of the present invention and at the higher operating temperatures which may therefore be employed, the particles of smaller size tend to be more readily agglomerated and the particles larger than 250–300 microns are continuously removed.

With the general nature and objects of the invention having been thus set forth, the latter will best be understood from the more detailed description hereinafter, in which reference will be made to the accompanying diagrammatic sketch of apparatus suitable for carrying out a preferred embodiment of the invention.

Referring now in detail to the diagram, the system consists essentially of a gaseous hydrocarbon converter or oxidizer 10, a packed vessel classifier 19, and a metal carrier oxidizer or regenerator 27. It is understood that other types of classifier may be substituted without departing from the spirit of the invention.

In operation, the hydrocarbon oxidizer 10 has a dense bed of metal oxide carrier having a fluidizable particle size which is fluidized to form an upper lever 13 by gaseous reactants and reaction products flowing upward at a linear velocity of about 0.3–2.5 feet per second at the top of the bed. A gaseous hydrocarbon stream, such as natural gas or methane preferably preheated to about 800–1000° F., enters by line 11. Line 36 is provided for reprocessing tail gas. Stripping gas, preferably steam super-heated to the same temperature as the preheated hydrocarbon gas, is introduced in the tube surrounding the opening of the reverse standpipe 14 through line 12. The synthesis gas produced, as well as any unreacted hydrocarbon gases substantially free of entrained catalyst are then passed through a gas-solids separator 15 such as a cyclone, filter, or electrical precipitator provided with a return line 16, removing the last traces of entrained catalyst. Product gases and unreacted hydrocarbons are then withdrawn through line 17, where they may pass directly to the hydrocarbon synthesis unit or they may go through a supplementary clean-up oxidation stage. The heat required for the oxidation of natural gas in oxidizer 10 is supplied as sensible heat of reoxidized metal oxide transmitted from the carrier regenerator 27 by standpipe 33. The regenerator 27 is preferably operated at a temperature of about 50–200° F. higher than the natural gas oxidizer 10. The oxidizer temperature may vary according to the nature of the metal oxide carrier, but in general the temperature in the gas oxidizer 10 is in the range of 1400–1800° F., that in the regenerator 1600–2000° F. To provide for circulation of the fluidized solids, a pressure differential is maintained between the oxidizer 10 and the regenerator 27, the former operating generally in the preferred range of 75–500 p. s. i. g., depending on the pressure of the hydrocarbon synthesis unit, and the regenerator about 50–200 p. s. i. g. lower.

By means of standpipe 14 or other known methods of particle transfer such as by lockhoppers, and because of the pseudo-hydrostatic pressure exerted by the fluidized carrier in the dense phase reaction zone, the carrier is continuously withdrawn into the vessel 19 which is packed with Raschig rings, Berl saddles, or other packing effective for preventing top-to-bottom mixing and for separating coarse particles from finer ones. At the bottom of the vessel there is an inlet 18 for admitting fluidizing elutriating gas, such as depleted air. In the packed vessel 19 the spent and partially spent carrier is fluidized, forming a dense turbulent mass that is restricted by the packing to a minimum of top to bottom mixing, and an upper layer 20. The velocity of the fluidizing gas is 0.1 to 1 ft./sec., sufficient to keep the particles of a size suitable for fluidization, about 10 to 300 microns diameter, in the dense phase, the agglomerates settling to the bottom of the vessel 19, where they may be withdrawn, ground to a suitable size range, and returned to the regenerator 27 through line 35, or they may be discarded.

The proportion of total carrier stream from the oxidizer to be classified may vary from a relatively small amount to the total stream from the oxidizer 10, depending upon the rate of agglomeration which controls the amount of material to be removed. Preferably, the classifier is so operated that the total circulating stream has less than 10% of particles retained by a 100 mesh screen.

The depleted air or other fluidizing medium passes through a cyclone or other type of gas-solids separator to remove entrained solids and, after heat exchange, may be vented.

The carrier regenerator 27 is preferably at an elevated position with respect to the natural gas converter 10 and contains a dense bed of reduced metal oxide fluidized by a stream of air preheated preferably to about 800–1000° F. and entering the regenerator through line 26 at a velocity of about 0.3–2 ft./sec. and in amount about 2 to 3 volumes per volume natural gas supplied to the converter 10. This is usually sufficient to reoxidize the reduced metal and the lower metal oxides to the higher state of oxidation.

The reoxidized carrier passes continuously from a lower portion of the fluidized bed in regenerator 27 into an aerated standpipe 33 and flows under pseudo-hydrostatic pressure through the standpipe control valve 34 into the oxidizer 10 below the level 13 of the fluidized carrier in that chamber. The reoxidized carrier, substantially at the temperature of the regenerator, is reduced in the oxidizer by the feed gas and is returned under pressure through standpipes and lines to the classifying vessel 19 and then to the regenerator as described.

The spent air flue gas is withdrawn through a cyclone 29 or other type of gas-solids separator provided with a solids return pipe 30 and, after heat exchange with incoming air, may be vented or preferably be returned to the classification vessel 19 as fluidizing medium for the particle classification stage of the invention.

The embodiment of the invention as illustrated in the drawing may be modified and still remain within the spirit of the invention. The classifier, instead of being a packed vessel or chamber, may be a vessel equipped with plates or baffles, a screening device, or an expanded sedimentation chamber in which the velocity of the fluidized solids stream is diminished sufficiently for the agglomerates to settle out. The classification stage may be inserted in the cycle after the regeneration stage. Instead of using standpipes for circulating solids between oxidizer, classifier and regenerator, other conventional means for conveying fluidizable solids, such as mechanical conveyors, lock hoppers, etc. may be used.

The foregoing description, though illustrating a specific application of the invention is not intended to exclude other modifications obvious to those skilled in the art, and which are within the scope of the invention.

I claim:

1. In the process of converting low molecular weight normally gaseous hydrocarbons into gas mixtures rich in carbon monoxide and hydrogen by oxidizing said hydrocarbons with a dense turbulent mass of a finely-divided metalliferous oxygen carrier fluidized by upwardly flowing gases in a system comprising a hydrocarbon oxidation zone and a metalliferous oxygen carrier regeneration zone, the improvement which comprises continuously passing a mixture of at least partially reduced oxygen carrier particles of fluidizable and greater than fluidizable size from the dense turbulent mass in said hydrocarbon oxidation zone, into a fluidized classification zone containing a packing of refractory material in the interstices of which the said particles are classified by passing a fluidizing gas substantially inert to said particles through said fluidized classification zone, separating in the dense phase of said fluidized classification zone particles of fluidizable size from large particles of greater than the normally maximum fluidizable size of about 300 microns, withdrawing the said large particles from said fluidized classification zone, continuously withdrawing from the dense phase of said fluidized classification zone a separate fluidized stream of said particles of fluidizable size and returning at least a portion of said fluidized stream to said system at a point after the hydrocarbon oxidation zone and not beyond the regeneration zone.

2. The process according to claim 1 in which the fluidized gas passed through said classification zone is air depleted in oxygen.

3. The process according to claim 2 in which the fluidizing gas is depleted air from said metalliferous oxygen carrier regeneration zone.

4. The process of claim 1 in which said system comprises a metalliferous oxygen carrier regeneration zone in which a dense, turbulent fluidized mass of said at least partially reduced and classified carrier is regenerated with air at an oxidizing temperature and is returned to said hydrocarbon oxidation zone substantially at the temperature of said regeneration zone.

5. The process according to claim 1 in which said carrier particles comprise at least a minor portion of iron.

WALTER A. HERBST.

REFERENCES CITED

The following references are of record in the file of this patent:

UNITED STATES PATENTS

| Number | Name | Date |
| --- | --- | --- |
| 2,355,016 | Stein, Jr. | Aug. 1, 1944 |
| 2,425,754 | Murphree et al. | Aug. 19, 1947 |
| 2,434,843 | Fahnestock | Jan. 20, 1948 |
| 2,449,635 | Barr | Sept. 12, 1948 |
| 2,467,803 | Herbst | Apr. 19, 1949 |